(12) United States Patent
Lee et al.

(10) Patent No.: US 8,452,047 B2
(45) Date of Patent: May 28, 2013

(54) METHOD AND APPARATUS FOR RECOGNIZING A PLURAL NUMBER OF FACES, AND METHOD AND APPARATUS FOR REGISTERING FACE, AND AN IMAGE CAPTURING METHOD AND SYSTEM

(75) Inventors: Jong-ha Lee, Hwaseong-si (KR);
Jung-bae Kim, Hwaseong-si (KR);
Seong-deok Lee, Suwon-si (KR);
Young-kyoo Hwang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1123 days.

(21) Appl. No.: 12/076,273

(22) Filed: Mar. 14, 2008

(65) Prior Publication Data
US 2009/0141949 A1 Jun. 4, 2009

(30) Foreign Application Priority Data
Dec. 3, 2007 (KR) ........................ 10-2007-0124532

(51) Int. Cl.
*G06K 9/00* (2006.01)
(52) U.S. Cl.
USPC .......................................... 382/103; 382/118

(58) Field of Classification Search
USPC ................................................ 382/103, 118
See application file for complete search history.

(56) References Cited

U.S. PATENT DOCUMENTS

| 6,188,777 | B1 * | 2/2001 | Darrell et al. | 382/103 |
| 7,203,367 | B2 * | 4/2007 | Shniberg et al. | 382/224 |
| 2002/0176609 | A1 * | 11/2002 | Hsieh et al. | 382/118 |
| 2003/0228032 | A1 * | 12/2003 | Rui et al. | 382/103 |
| 2004/0220769 | A1 * | 11/2004 | Rui et al. | 702/179 |
| 2006/0093190 | A1 * | 5/2006 | Cheng et al. | 382/115 |

FOREIGN PATENT DOCUMENTS
JP 2002-333652 11/2002

* cited by examiner

*Primary Examiner* — Hadi Akhavannik
(74) *Attorney, Agent, or Firm* — Staas & Halsey LLP

(57) ABSTRACT

Provided are a method and apparatus for recognizing a plurality of faces. In the method, a plurality of faces are detected from received video frames, the detected faces are sequentially recognized in predetermined frames that fall within a predetermined recognition period from among the detected frames, and then, the recognized faces are sequentially displayed. Accordingly, the amount of calculation is less than when simultaneously performing face detection and recognition on each frame.

11 Claims, 7 Drawing Sheets

| FRAME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| DETECTION | 3 | | | | | | | | 2 | | | | | | | | 6 | | | | | | | | 3 | | | |
| TRACKING | | 3 | 3 | 3 | 3 | 3 | 3 | 2 | 1 | 3 | 3 | 3 | 3 | 3 | 2 | 1 | 1 | 7 | 7 | 7 | 6 | 6 | 6 | 5 | 2 | 5 | 5 | 5 |
| RECOGNITIOND | | 1 | | 1 | | 1 | | | 1 | | 1 | | | | | | | 1 | | 1 | | 1 | | 1 | | 1 | | 1 |
| PRESENT STATE OF ID DISPLAYED | U1 | A | A | A | A | A | A | A | A | A | A | A | A | A | | | U1 | A | A | A | A | A | A | U1→A | A | A | A |
| | U2 | U2 | U2 | B | B | B | B | | | | | | | | | | U2 | U2 | U2 | B | B | B | B | B | | | | |
| | U3 | U3 | U3 | U3 | U3 | C | C | C | U3→C | C | C | C | C | | | | U3 | U3 | U3 | U3 | U3 | U3 | U3 | U3 | U3 | U3 | U3 | U3 |
| | | | | | | | | | U4 | D | D | D | D | D | D | D | D | D | D | D | D | D | D | | U4 | U4 | U4 | D |
| | | | | | | | | | | | | | | | | | U5 | U5 | U5 | U5 | U5 | U5 | U5 | U5 | E | E | E | E |
| | | | | | | | | | | | | | | | | | U6 | U6 | U6 | U6 | | | | | | | | |
| | | | | | | | | | | | | | | | | | U7 | U7 | U7 | U7 | U7 | U7 | U7 | U7 | U7 | G | G | G |

FIG. 4

| FRAME | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| DETECTION | 3 | | | | | | | | 2 | | | | | | | | 6 | | | | | | | | 3 | | | |
| TRACKING | | 3 | 3 | 3 | 3 | 3 | 3 | 2 | 1 | 3 | 3 | 3 | 3 | 2 | | 1 | 1 | 7 | 7 | 7 | 6 | 6 | 6 | 5 | 2 | 5 | 5 | 5 |
| RECOGNITION | 1 | | 1 | 1 | | 1 | | 1 | | 1 | | 1 | | | | 1 | | 1 | | 1 | | 1 | | 1 | | 1 | | 1 |
| PRESENT STATE OF ID DISPLAYED | U1 | A | A | A | A | A | A | A | A | A | A | A | A | A | A | U1 | A | A | A | A | A | A | A | A | U1→A | A | A | A |
| | U2 | U2 | B | B | B | B | B | | | | | | | | | | U2 | U2 | B | B | B | B | B | B | | | | |
| | U3 | U3 | U3 | U3 | U3 | C | C | C | U3→C | D | D | D | D | D | D | U3 | U3 | U3 | U3 | U3 | U3 | U3 | U3 | U3 | U3 | U3 | U3 | U3 |
| | | | | | | | | | U4 | D | D | D | D | D | D | D | D | D | D | D | D | D | D | | U4 | U4 | U4 | D |
| | | | | | | | | | | | | | | | | | U5 | U5 | U5 | U5 | U5 | U5 | U5 | U5 | E | E | E | E |
| | | | | | | | | | | | | | | | | | U6 | U6 | U6 | U6 | | | | | | | | |
| | | | | | | | | | | | | | | | | | U7 | U7 | U7 | U7 | U7 | U7 | U7 | U7 | U7 | G | G | G |

METHOD AND APPARATUS FOR RECOGNIZING A PLURAL NUMBER OF FACES, AND METHOD AND APPARATUS FOR REGISTERING FACE, AND AN IMAGE CAPTURING METHOD AND SYSTEM

CROSS-REFERENCE TO RELATED PATENT APPLICATIONS

This application claims the benefit of Korean Patent Application No. 10-2007-0124532, filed on Dec. 3, 2007, in the Korean Intellectual Property Office, the disclosure of which is incorporated herein in its entirety by reference.

BACKGROUND OF THE INVENTION

1. Field of the Invention

The present invention relates to an image capturing method and apparatus, and more particularly, to a method and apparatus for recognizing a plural number of faces, a method and apparatus for automatically registering an interested face, and an image capturing method and system using automatic registration of an interested face and recognition of a plurality of faces.

2. Description of the Related Art

Recently, face recognition has been generally used in apparatuses, such as a digital still camera (DSC), a digital single lens reflex (DSLR) camera, a phone camera, or a camcorder, which need a face recognition function for live view, image capturing apparatuses that need to capture a high-definition image of a person of interest, and apparatuses that need to recognize the faces of a large number of persons in real time.

Such an image capturing apparatus, e.g., a digital camera, supports an intelligent function of detecting only a face from an image that is to be captured when detecting and recognizing a character of interest.

However, a face registration method would be inconvenient since a user has to allocate identification (ID) to a face that is to be registered in an image capturing apparatus. Also, an ID input keyboard or an additional user interface, which an external user input device, must be added to a conventional camera interface in order to allocate ID to a face that is to be registered.

Also, a conventional digital camera must operate in real time in order to process auto exposure (AE) and auto focusing (AF), which are functions unique to a camera, and additional user interaction information in units of frames. Thus, if a face detection module and a face recognition module are added in order to obtain a high-definition image focusing on a character of interest, additional hardware resources are required.

Even if face detection/recognition is embodied in a hardware manner and is performed using a multi-thread scheme, a time required to perform face recognition is proportional to the total number of faces detected. Thus, if the total number of faces detected increases, the result of face recognition is delayed by several frames or several tens frames. In this case, a time delay occurs between the result of face recognition and a frame being currently displayed, and thus, it is impossible to implement synchronous processing.

Accordingly, there is a need to develop a face detection and recognition method capable of preventing such a time delay without overloading functions unique to a camera in a hardware manner.

SUMMARY OF THE INVENTION

The present invention provides a method and apparatus for recognizing a plurality of faces by performing face recognition on each of detected faces in a time division manner and using a combination of face detection and face tracking, thereby effectively displaying the result of face recognition.

The present invention also provides a face registration method and apparatus capable of simplifying a face registration process included in face recognition by allowing a plurality of detected faces to be automatically categorized, registered and managed as faces of interest.

The present invention also provides an image capturing method and system for obtaining a high-definition image concentrating on characters by using automatic face registration and recognition of a plurality of faces.

According to an aspect of the present invention, there is provided a method of recognizing a plurality of faces, the method including detecting a plurality of faces from received video frames, sequentially recognizing one of the detected faces in predetermined frames that fall within a predetermined recognition period from among the frames, and sequentially displaying the recognized faces.

According to another aspect of the present invention, there is provided a face registration method comprising detecting a plurality of faces from received video frames, extracting and registered characteristics of the registered faces, comparing the registered faces with already registered faces, and clustering the registered faces, and setting a face of interest from among the registered faces by checking the result of clustering according to predetermined conditions.

According to another aspect of the present invention, there is provided an image capturing method comprising detecting a plurality of faces from received video frames, setting and registering faces of interest from among the detected faces, recognizing the registered faces, detecting the locations of the registered faces, and displaying the registered faces, and generating photographing control information based on location information of the registered faces.

According to another aspect of the present invention, there is provided an apparatus for recognizing a plurality of faces, the apparatus including a detection unit detecting a plurality of faces from received video frames, a recognition unit sequentially recognizing one of the detected faces in predetermined frames that fall within a predetermined recognition period from among the frames, and a display unit sequentially displaying the recognized faces.

According to another aspect of the present invention, there is provided a face recognition apparatus comprising a detection unit detecting a plurality of faces from received video frames, a registration unit extracting and registering characteristics of the detected faces, a clustering unit comparing the registered faces with already registered faces and clustering the registered faces, and an interested face setting unit setting a face of interest from among the registered faces by determining the result of clustering according to predetermined conditions.

BRIEF DESCRIPTION OF THE DRAWINGS

The above and other features and advantages of the present invention will become more apparent by describing in detail exemplary embodiments thereof with reference to the attached drawings in which:

FIG. 4 is a flowchart illustrating a method of recognizing a plurality of faces according to another embodiment of the present invention;

DETAILED DESCRIPTION OF THE INVENTION

Exemplary embodiments of the present invention will now be described more fully with reference to the accompanying drawings.

Figure 1:
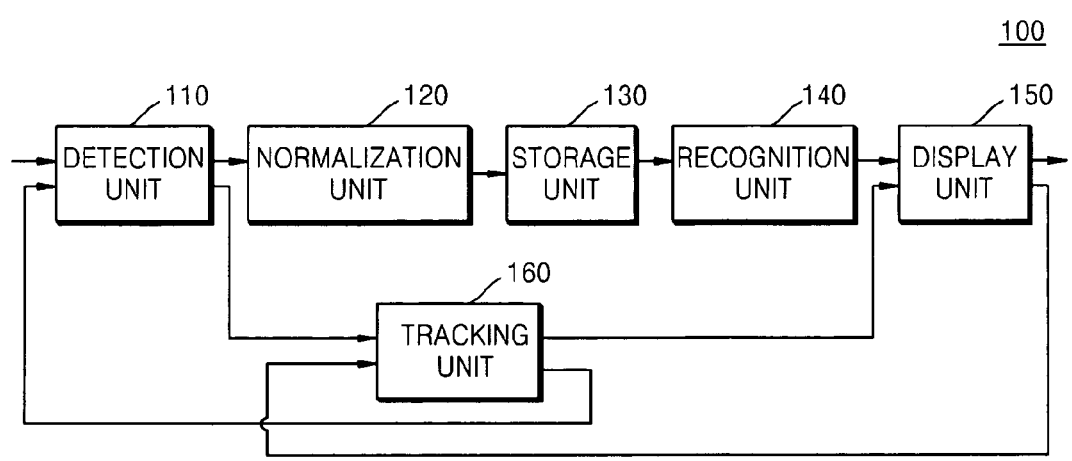
FIG. 1 is a block diagram schematically illustrating an apparatus for recognizing a plurality of faces according to an embodiment of the present invention.

FIG. 1 is a block diagram schematically illustrating an apparatus 100 for recognizing a plurality of faces according to an embodiment of the present invention. Referring to FIG. 1, the recognition apparatus 100 includes a detection unit 110, a normalizing unit 120, a storage unit 130, a recognition unit 140, a display unit 150, and a tracking unit 160.

The recognizing apparatus 100 performs time-division face recognition in a predetermined image capturing system (not shown) while effectively combining the face recognition with face detection and/or tracking, thereby improving the performance of face detection and recognition. Here, examples of the image capturing system include a digital camera, a digital still camera (DSC), a digital single lens reflex (DSLR) camera, a phone camera, a PDA camera, and a camcorder.

In time-division face recognition, the result of recognizing a plurality of faces detected from an obtained image are sequentially expressed, and the amount of time required for the recognition, which exponentially increases in proportional to the total number of the faces, is divided on the time axis. That is, the amount of time required for the recognition is less than when recognizing all faces in one frame.

The detection unit 110 performs face detection by comparing face candidate regions of an image captured by an image capturing apparatus (not shown) with learned face images. Face detection may be performed using conventional, various detection algorithms. For example, face detection may be performed by continuously performing a plurality of stages by extracting characteristics from each image and discarding images that are determined not to show insufficient object characteristics by a cascaded multi-classifier. Otherwise, face detection may be performed by sequentially performing calculation for classification by the cascaded classifier while classifying not only images showing face characteristics but also images showing insufficient face characteristics into face images. In this case, one or more face images can be detected, that is, a plurality of faces are present in an image.

According to an embodiment of the present invention, the detection unit 110 sets a face detection period $T_D$, and performs face detection only in the face detection period $T_D$. That is, face detection is performed on only frames corresponding to the face detection period $T_D$, and not on all frames, thereby increasing the speed of detection. Although the detection unit 110 is included in the recognizing apparatus 100 in the current embodiment of the present invention, it may be separated as an additional detection module from the recognizing apparatus 100.

The normalizing unit 120 normalizes face images detected. That is, the normalizing unit 120 normalizes various sized face images to images of a predetermined size.

The storage unit 130 stores the normalized face images. Otherwise, detected frames, and information regarding the result of the face detection, i.e., the coordinates of the locations of the faces, may be stored without using the normalizing unit 120. In this case, the normalizing unit 120 is included in the recognition unit 140.

The recognition unit 140 performs face recognition on one face image in each frame corresponding to a predetermined recognition period $T_R$. Here, face recognition is performed on face images stored by accomplishing class classification using conventional, various face recognition algorithms, such as support vector machine (SVM). That is, one face is recognized in only each frame corresponding to the face recognition period $T_R$. Thus, the amount of time for face recognition is shorter than when recognizing all faces in each frame.

The display unit 150 displays the result of face recognition. For example, if a plurality of faces are displayed on a liquid crystal display (LCD) window for preview, they are indicated with specific identification (ID), e.g., A, B, or C. In this case, the result of recognizing one face is also displayed in units of frames, and whether already indicated ID is maintained in units of frames is determined according to the result of calculation of the tracking unit 160.

The tracking unit 160 extracts characteristics from a face image detected by the detection unit 110, and detects an image region showing a distribution of characteristics similar to the extracted characteristics from a subsequent frame near the detected face image. Thus, a face can be tracked by detecting the location of a face in a subsequent frame within a shorter time than when face detection is performed. Here, the tracking unit 160 tracks the detected face image by using a conventional tracking algorithm. The tracking unit 160 provides the result of tracking to the display unit 150 so that the face image detected in a current frame can be displayed.

The tracking unit 160 receives the location information of the face recognized in the current frame from the display unit 150, performs face tracking in a subsequent frame based on the location information, and provides the result of tracking to the detection unit 110 so that face detection can be performed based on the result of tracking.

According to an embodiment of the present invention, a maximum number $C_{MAX}$ of frames that can be tracked by the tracking unit 160 is set in order to limit a maximum number of frames that can be tracked, so that propagation of an error using tracking can be suppressed thereby preventing a continuous tracking error from occurring.

Figure 2:
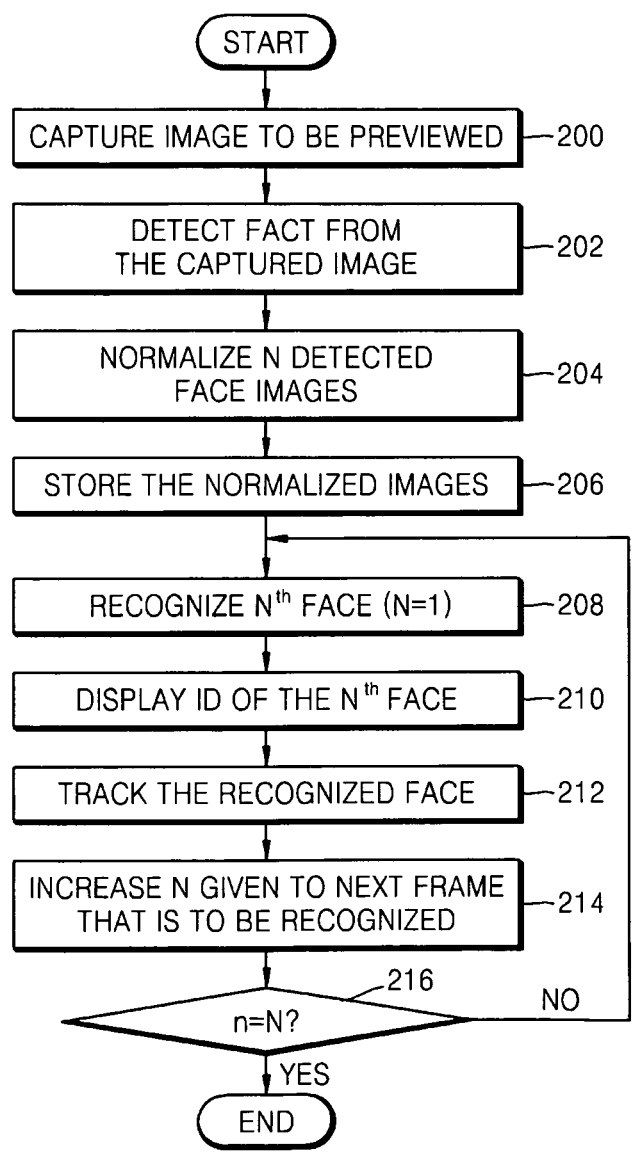
FIG. 2 is a flowchart illustrating a method of recognizing a plurality of faces according to an embodiment of the present invention.

FIG. 2 is a flowchart illustrating a method of recognizing a plurality of faces according to an embodiment of the present invention. Referring to FIG. 2, in operation 200, an image that is to be previewed is captured. In operation 202, face images are detected from the captured image. In operation 204, the detected images are normalized. In operation 206, the normalized face images are stored.

In operation 208, face recognition is performed on an nth face image from among the stored face images (n=1). In operation 210, the identification (ID) of the nth face image is indicated. In operation 212, the recognized face image is tracked.

In operation 214, n is increased by one in a subsequent recognition period, that is, in a subsequent frame that is to be recognized. In operation 216, it is determined whether n=N, that is, whether face recognition is performed on all the stored face images. Here, N denotes the total number of the face images detected in operation 204. If there is a face that has yet to be recognized, face recognition is performed on the nth face image from among the stored face images (n=2). Such a process is repeatedly performed until face recognition is performed on all the face images, and then, the method is completed.

In the current embodiment, a plurality of faces are recognized by performing face recognition on one of the faces in a frame corresponding to each recognition period $T_R$ and then displaying the result of recognition on a preview display window, e.g., an LCD. If the total number of detected face images is N, face detection and tracking algorithms are applied to the detected face images during frames N×$T_R$. A recognized face image is displayed together with the result of recognizing the face image after the frames N×$T_R$. If a new face image is detected during the frames N×$T_R$, the result of face detection is updated.

Figure 3:
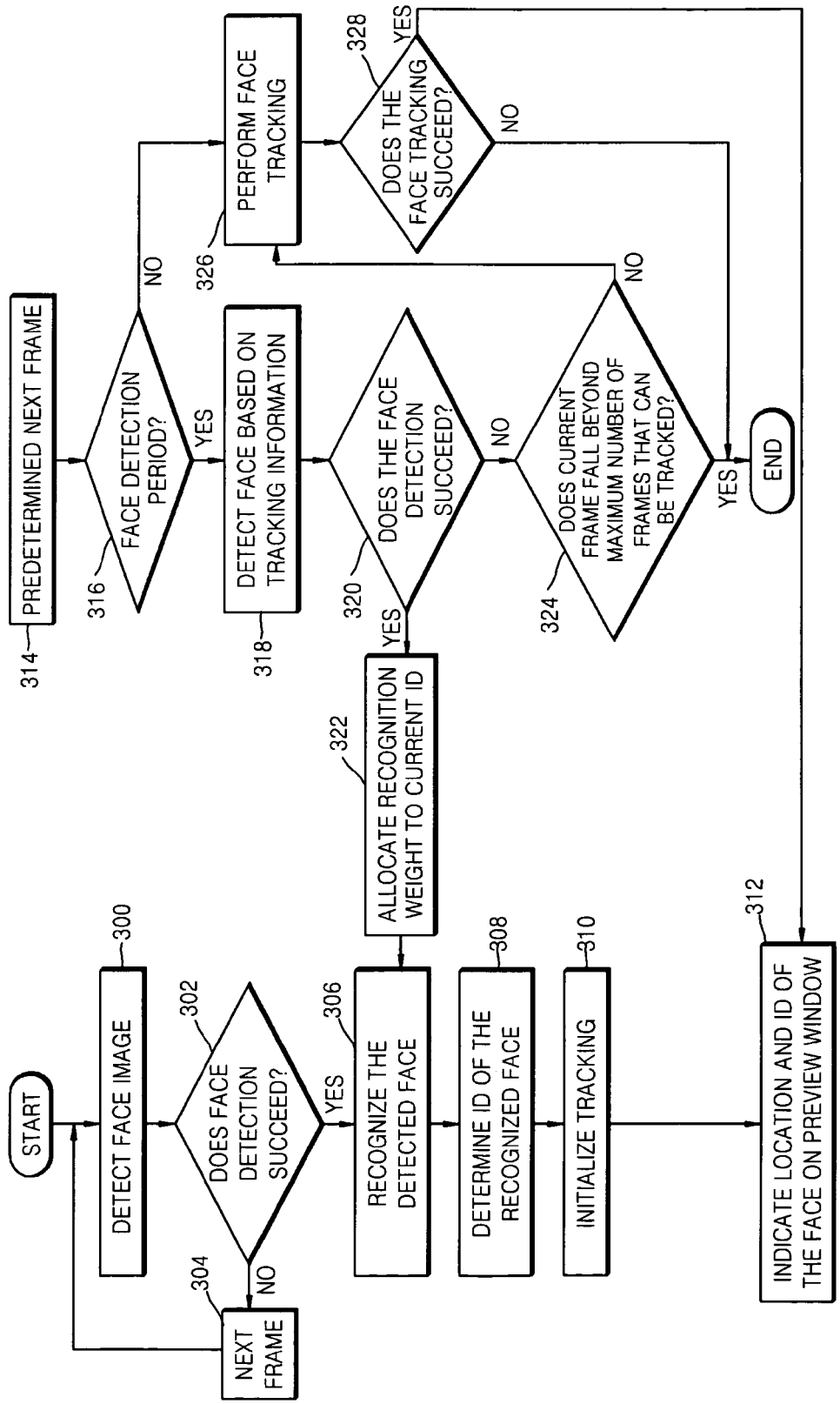
FIG. 3 is a flowchart illustrating a method of recognizing a plurality of faces according to another embodiment of the present invention.

FIG. 3 is a flowchart illustrating a method of recognizing a plurality of faces according to another embodiment of the present invention. Referring to FIG. 3, in operation 300, face detection is performed on a current frame. In operation 302, if a face is detected from the current frame, the method proceeds to operation 306. In operation 302, if a face is not detected from the current frame, the method proceeds to operation 304, in which face detection is performed on a subsequent frame.

In operation 306, the detected face is recognized. Alternatively, a normalizing process and a storing process may be performed prior to performing operation 306. In operation 308, ID of the recognized face is determined. In operation 310, face tracking is initialized. That is, in order to count a maximum number of frames that can be tracked $C_{MAX}$, a counter is set to '0' and face characteristics are extracted again for face tracking. Next, in operation 312, the location and ID of the face are displayed on a preview window.

If the method proceeds to a predetermined next frame in operation 314, it is determined whether a current period is a face detection period $T_D$, that is, whether face detection is performed on the next frame, in operation 316. If the current period is the face detection period $T_D$, face detection is performed using information for tracking a previous frame, e.g., the location, size or ID of a face corresponding to the previous frame (operation 318). If there is no information for tracking the previous frame, general face detection is performed. In operation 320, if face detection is succeeded, the method proceeds to operation 322, in which a recognition weight is allocated to the ID determined in the previous frame. That is, a fact that the same character is highly probably included in similar locations of the current frame and the previous frame is used. Thus, it is possible to perform face recognition to be robust to noise, using the ID determined in the previous frame.

In operation 320, if face detection is not succeeded, the method proceeds to operation 324, in which it is determined whether the current frame falls beyond the range of the maximum number of frames that can be tracked $C_{MAX}$. If the current frame does not fall beyond the range, face tracking is performed, in operation 326.

In operation 316, if the current period is the face detection period $T_D$, face tracking is performed, in operation 326.

In operation 326, if face tracking is succeeded, the result of tracking is displayed in the preview window, in operation 312.

In a method of recognizing a plurality of faces according to another embodiment of the present invention, the face detection period $T_D$ and the maximum number of frames that can be tracked $C_{MAX}$ are set so that face tracking which proceeds faster than face detection can be performed for a predetermined amount of time instead of face detection, thereby compensating for the low operating speed of face detection. Also, high-precision face detection is performed for every face detection period $T_D$, and face tracking is continuously performed when face detection fails, so that face detection and face tracking can be complementary to each other.

FIG. 4 is a flowchart illustrating a method of recognizing a plurality of faces according to another embodiment of the present invention. Referring to FIG. 4, face detection is performed on every eighth frame, that is, a face detection period $T_D$ is 8, and face recognition is performed on every second frame, that is, a face recognition period $T_R$ is 2. "U" denotes unknown ID, that is, a face that has yet to be recognized in a detected face image, and "A" through "G" denote registered IDs.

First, in a frame #0, face detection is first performed, thus detecting three faces U1, U2 and U3. Since face recognition has yet to be performed on the frame #0, all the three faces are indicated with "U". In a frame #1, the face U1 from among the faces U1 through U3 detected in the frame #0 is recognized and displayed as "A". At the same time, the other faces U2 and U3 are tracked while continuously tracking the face A. Alternatively, face recognition and tracking can be performed on the frame #1 right after detecting the faces U1 through U3 from the frame #0.

In a frame #2, face tracking is performed on all the three faces without performing face recognition since a current period is not the face recognition period $T_R$. Here, the face A has been recognized.

In a frame #3, since a current period is the face recognition period $T_R$, a next face that has not yet recognized is recognized and the ID of the recognized face is indicated with "B" while continuously tracking the face U3. The recognized faces A and B are also continuously tracked in this case.

In a frame #5, since a current period is the face recognition period $T_R$, the ID of the other face U3 is recognized and indicated as "C".

In a frame #7, face tracking is performed while the IDs of the detected three faces are respectively recognized as "A", "B", and "C". Here, tracking of the face whose ID is B is stopped since the face does not satisfy predetermined tracking conditions. Although the frame #7 fall within the face recognition period $T_R$, face recognition is not performed thereon since there is no object that is to be recognized.

In a frame #8, since a current period is the face detection period $T_D$, face detection is performed thus detecting two faces U3 and U4. For face recognition, the images of the detected faces U3 and U4 are normalized and stored in a storage unit. Here, the face whose ID is C is determined to be identical to the face U3 detected by tracking, and thus, the ID of the face is maintained. The face whose ID is C is detected again, and thus, tracking begins again at the location of the frame #8, at which the face was detected. Also, the face whose ID is A is not a face that detected again and thus is continuously tracked.

In a frame #9, face recognition is first performed on the face U4, since tracking has revealed that the face U3 in the frame #8 is determined to be identical to the face whose ID is C although the face U3 is not recognized. After performing face recognition, the ID of the face U4 is indicated as "D".

In a frame #11, for precise face recognition, face recognition may be performed again on the face U3 although the ID of the face U3 in the frame #8 has been determined to be C. The face U3 is recognized to be identical to the face whose ID is C and is thus indicated as "C".

In a frame #16, six new faces U1, U2, U3, U4, U5 and U6 except the face whose ID is D are detected. The ID D is maintained from a frame #9 to the frame #16 as the result of face tracking.

Since frames #17 and 19 correspond to the face recognition period $T_R$, face recognition is respectively performed on the faces A and B. In a frame #20, although face recognition has yet to be performed on the face U6, the U6 is not excluded from among faces that are to be recognized since tracking of the frame #20 failed.

In a frame #21, the face U3 is not recognized as a face that is to be registered, and is continuously indicated as "U3".

In a frame #24, new faces are detected while a face U7 has yet to be recognized. Thus, a normalized image extracted from the frame #16 is replaced with a normalized image generated from the frame #24, as a normalized image that is to be recognized. Otherwise, a normalized image may be added to the normalized image extracted from the frame #16, and face recognition may be performed on both the normalized images in units of continuous frames or in a predetermined recognition period.

Figure 5:
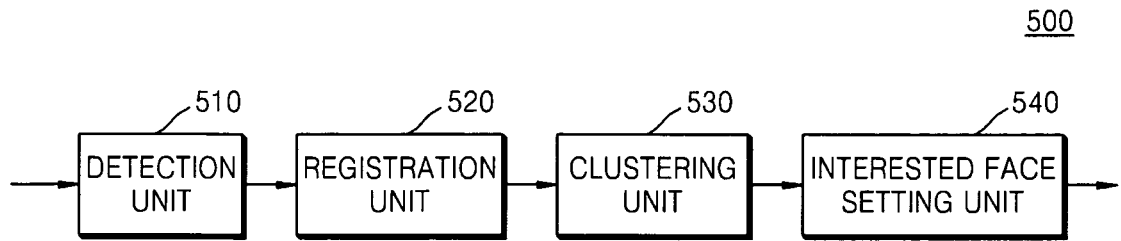
FIG. 5 is a block diagram schematically illustrating an apparatus for registering a face according to an embodiment of the present invention.

FIG. 5 is a block diagram schematically illustrating an apparatus 500 for registering a face according to an embodiment of the present invention. Referring to FIG. 5, the registration apparatus 500 includes a detection unit 510, a registration unit 520, a clustering unit 530, and an interested face setting unit 540.

The registering apparatus 500 automatically registers the face of a character of interest who a user desires to register and manage. In an embodiment of the present invention, the registering apparatus 500 can recognize a character of interest and obtain a high-definition image concentrating thereon even if a user does not allocate specific ID to the character. Thus, it is possible to allow the user to obtain an image concentrating a character of interest, increase the user's convenience without performing a complicated face registration process, and determine whether a character is a character of interest.

The detection unit 510 detects a face by comparing face candidate regions included in an image captured by an image capturing device (not shown) with learned face images. Face detection may be performed using conventional, various detection algorithms.

According to the current embodiment of the present invention, the detection unit 510 is included in the registering apparatus 500 but may be separated from the registering apparatus 500, as an additional detection module.

The registration unit 520 registers a detected face image.

The clustering unit 530 allocates ID to each of the detected face images by performing clustering on the face images by comparing them with one another. Here, clustering is a data mining technique of grouping of data so that pieces of data belonging to a group can have similar characteristics. Clustering has been widely applied to the fields of pattern recognition and image processing. For example, identical characters can be grouped to the same group by comparing the information of the registered face images with one another.

If the total number and image quality of faces grouped as the same character according to the result of clustering, and times when the faces are registered are equal to or greater than a predetermined threshold, the interested face setting unit 540 sets the faces as an interested face. For example, the priority of a registered face is determined using information, such as the frequency of the face appearing in obtained images, the image resolution of the face, and latest time when the face is captured. Accordingly, the greater a number of times that an image is captured, the more images of an interested character that are registered, the higher the rate of recognizing the interested character.

Figure 6:
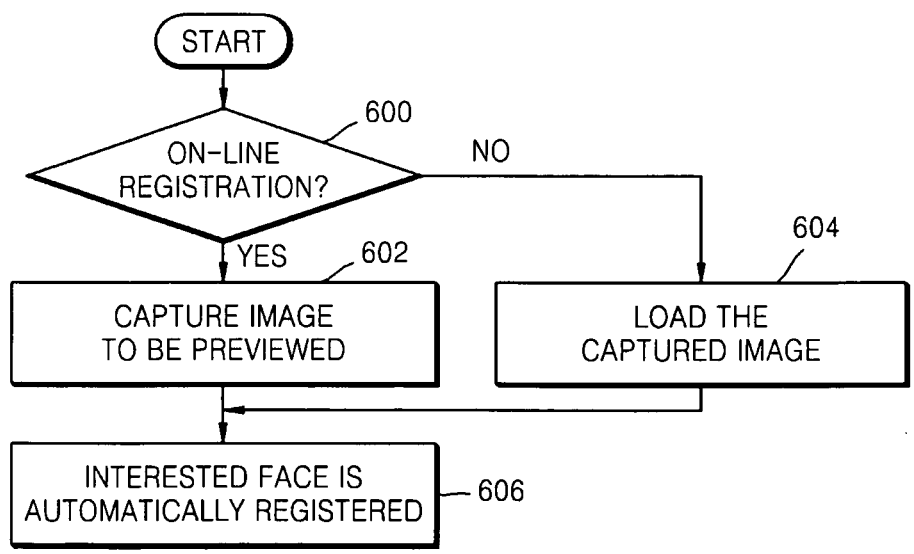
FIG. 6 is a flowchart illustrating a method of registering a face according to an embodiment of the present invention.

FIG. 6 is a flowchart illustrating a method of registering a face according to an embodiment of the present invention. Referring to FIG. 6, first, in operation 600, whether on-line registration is to be performed is inquired. If a user selects on-line registration, an image that is to be previewed is captured, in operation 602. If the user does not select on-line registration, a previously captured image or a stored image is loaded, in operation 604. In operation 606, an interested face is automatically registered. The automatic process of registering an interested face will be described later with reference to FIG. 7.

Figure 7:
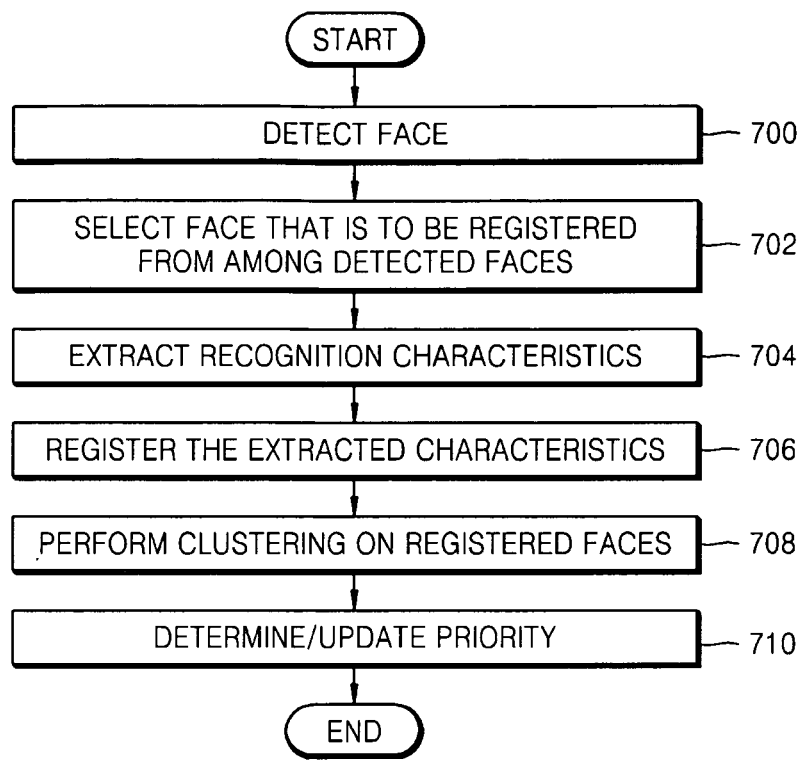
FIG. 7 is a flowchart illustrating a method of registering a face according to another embodiment of the present invention.

FIG. 7 is a flowchart illustrating a method of registering a face according to another embodiment of the present invention. Referring to FIG. 7, in operation 700, a face image is detected from either an image captured to be previewed or an image that has been captured and loaded. In operation 702, an image that is to be registered is selected from a plurality of detected face images. Here, a face image that is to be registered may be selected by a user or be automatically selected. Operation 702 may be skipped, and the method proceeds directly to operation 704, in this case.

In operation 704, recognition characteristics are extracted from the selected face image or all face images. In operation 706, the extracted characteristics are registered. In operation 708, clustering is performed on registered face images, in which face images of the same character are grouped to the same group and then ID is allocated to the group. Alternatively, the user may give priority to the allocated ID, and otherwise, ID is arbitrarily allocated to the group.

In operation 710, whether the character is to be set as an interested character is determined according to predetermined conditions, and the priority of the ID of the group is updated when the character is determined to be set as an interested character. In this case, priority values are calculated using information, such as the priority allocated to each ID by the user, the total number of face images belonging to each ID, and time when the face images are registered, and then, priority is automatically given to each ID according to the priority values. The predetermined conditions include the total number of registered face images and information of time when they are registered. A priority value can be calculated by:

$$\text{priority value} = w1*(\text{total number of registered face images}) + w2*(\text{temporal priority value}) + w3*(\text{priority value of current ID}) \quad (1),$$

wherein the later a face image that is registered, the higher the temporal priority value. If the user determines priority of current ID, the current ID may be given a high priority value. Also, "w1", "w2" and "w3" denote weights to be respectively allocated to factors, which can be appropriately determined according to the importance of the total number of registered face images, temporal priority, or the priority of the current ID.

Alternatively, if a priority value of a face is smaller than a predetermined threshold, the face may be excluded from interested faces.

In a face registration method according to an embodiment of the present invention, detected face images are registered, they are compared with one another in order to cluster face images of the same character to the same group, and then, whether the same character is an interested character is determined based on information, such as the total number of face images registered with respect to the same character, the quality of each face image, and time when each face image is registered. Accordingly, when recognizing a plurality of faces, it is possible to determine priority of faces on which AE, AF, and automatic white balance (AWB) are to be performed, based on the above information.

Figure 8:
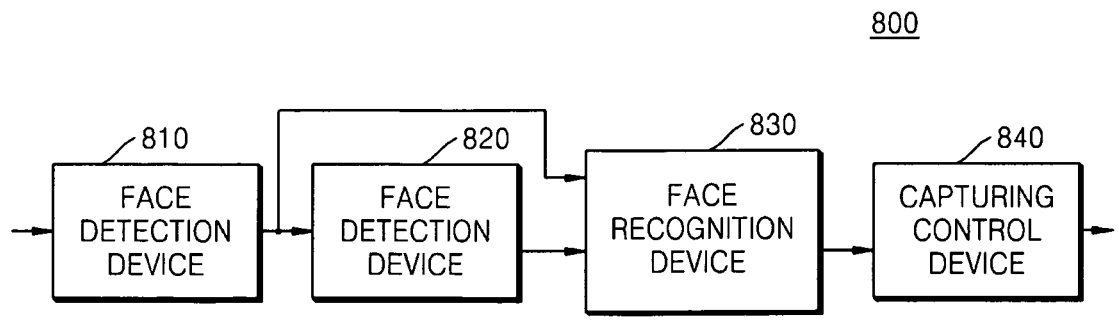
FIG. 8 is a block diagram of a system for capturing an image according to an embodiment of the present invention.

FIG. 8 is a block diagram schematically illustrating an image capturing system 800 according to an embodiment of the present invention. Referring to FIG. 8, the image capturing system 800 includes a face detection device 810, a face registration device 820, a face recognition device for recognizing a plurality of faces 830, and a photographing control device 840.

The image capturing system 800 automatically registers an interested character, expresses the result of recognizing a character by using a combination of detection and tracking, and performs photographing control while focusing on a character, thereby obtaining a high-quality image concentrated a character. Examples of the image capturing system 800 include a digital camera, a DSR, a DSLR, a phone camera, a personal digital assistant (PDA) camera, and a camcorder.

The face detection device 810 detects a face image from an image captured by an image capturing device (not shown).

The face registration device 820 receives detected face images from the face detection device 810, registers the detected face images, performs clustering on the registered face images by comparing them with one another, and then, registers the same character as an interested character, based on the total number of face images grouped as the same character, the quality of the face images, and time when the face images are registered.

The face recognition device 830 receives a plurality of detected face images from the face detection device 810, and performs face recognition on each of the detected face images in a time-division manner. Thus, face recognition requiring a large amount of calculation is not performed all the face images at once, thereby removing a time delay, and the result of performing face recognition is appropriately displayed. Also, the face recognition device 830 performs face tracking between face detection and recognition, thereby preventing desynchronization between face detection and recognition.

The photographing control device 840 receives location information regarding the registered face images from the face recognition device 830, estimates the location, distance, brightness and color characteristics of each of the registered face images, and generates photographing control information including focusing, exposure, flash, and white balance from the result of estimation. Although not shown in the drawings, the image capturing system 800 may further include a photographing unit that photographs characters while focusing on an interested character by using the photographing control information, and a post-processing unit that performs post processing on a photographed image.

Figure 9:
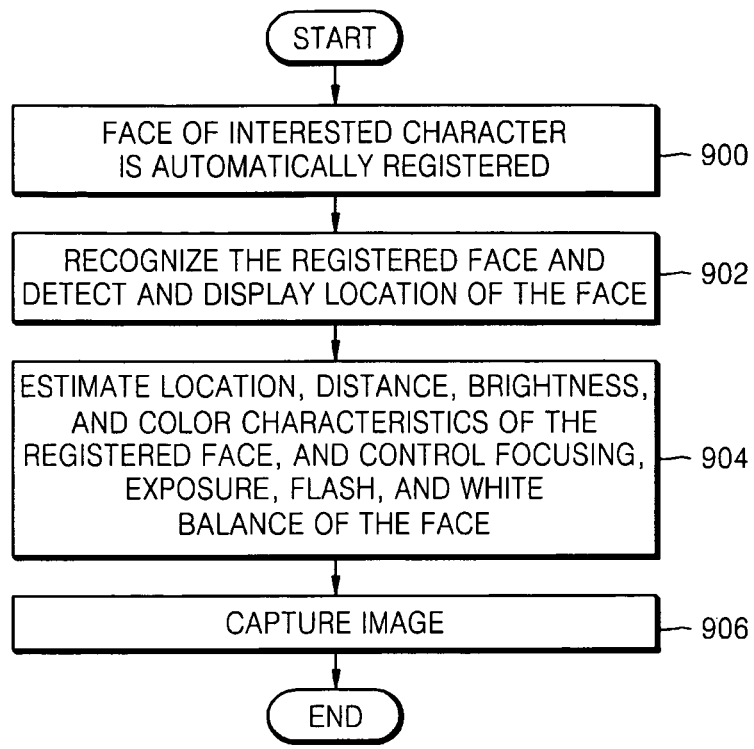
FIG. 9 is a flowchart illustrating a method of capturing an image according to an embodiment of the present invention.

FIG. 9 is a flowchart illustrating a method of capturing an image according to an embodiment of the present invention. Referring to FIG. 9, in operation 900, a face image of an interested character is automatically registered. In operation 902, the registered face image is recognized in order to detect the location thereof and then is displayed. In operation 904, information, such as the location, distance, brightness, and color characteristics, of the registered face image are estimated in order to control the focusing, exposure, flash, and white balance of the registered face image. Operation 904 is performed by generating photographing control information based on the estimated information. In operation 906, an image is captured using the photographing control information generated in operation 904.

The present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system. A functional program, code, and code segments for embodying the present invention can be easily derived by programmers in the technical field to which the present invention pertains.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of recognizing a plurality of faces, the method comprising:
   detecting a plurality of faces from received video frames; and
   sequentially recognizing one detected face at a time, from among the plurality of detected faces, in predetermined frames that fall within a predetermined recognition period in which face recognition is performed,
   wherein, in each subsequent predetermined recognition period in which face recognition is performed, a next detected face from among the plurality of detected faces is sequentially recognized.

2. The method of claim 1, further comprising: tracking the detected faces during the frames falling within the recognition period, and
   the faces are detected based on the result of tracking a previous video frame.

3. The method of claim 2, wherein, if the faces are detected based on the result of tracking the previous video frame, a weight is allocated to a face detected and recognized from the previous video frame.

4. The method of claim 1, further comprising:
   normalizing the detected faces; and
   storing the normalized faces.

5. The method of claim 1, wherein the tracking of the detected faces comprises continuously tracking the detected faces during a maximum number of frames that are to be tracked.

6. The method of claim 1, wherein the faces are detected during a predetermined detection period.

7. An apparatus for recognizing a plurality of faces, the apparatus comprising:
   a detection unit to detect a plurality of faces from received video frames; and
   a recognition unit to sequentially recognize one detected face at a time, from among the plurality of detected faces, in predetermined frames that fall within a predetermined recognition period in which face recognition is performed;
   wherein, in each subsequent predetermined recognition period in which face recognition is performed, the recognition unit sequentially recognizes a next detected face from among the plurality of detected faces.

8. The apparatus of claim 7,
further comprising a tracking unit to track the detected faces during the frames falling within the recognition period,
wherein the detection unit detects the faces based on the result of performing tracking on a previous video frame, and provides the result of detection to the recognition unit, and
the recognition unit allocates a weight to a face detected and recognized in the previous video frame based on the result of detection.

9. The apparatus of claim 7, further comprising:
a normalizing unit to normalize the detected faces; and
a storage unit to store the normalized faces.

10. The method of claim 1, further comprising sequentially displaying the recognized faces.

11. The method of claim 10, wherein the sequentially displaying the recognized faces comprises sequentially displaying a plurality of recognized faces on the display and sequentially identifying each recognized face on the display.

\* \* \* \* \*